(12) United States Patent
Buchholz et al.

(10) Patent No.: US 6,244,601 B1
(45) Date of Patent: Jun. 12, 2001

(54) SEALING SYSTEM FOR THE ROOF FRAME OF A HARD-TOP, COUPE, OR CONVERTIBLE

(75) Inventors: Hans-Volker Buchholz, Hildesheim; Jens Anders, Marienhagen, both of (DE)

(73) Assignee: Meteor Gummiwerke K.H. Badge GmbH & Co., Bockenem (DE)

( * ) Notice: Subject to any disclaimer, the term of this patent is extended or adjusted under 35 U.S.C. 154(b) by 0 days.

(21) Appl. No.: 09/331,461

(22) PCT Filed: Sep. 6, 1997

(86) PCT No.: PCT/EP97/04836

§ 371 Date: Jun. 21, 1999

§ 102(e) Date: Jun. 21, 1999

(87) PCT Pub. No.: WO98/26949

PCT Pub. Date: Jun. 25, 1998

(30) Foreign Application Priority Data

Dec. 19, 1996 (DE) .......................... 296 21 997 U (51) Int. Cl.⁷ ................. E06B 7/16; E06B 7/22; F16J 15/10

(52) U.S. Cl. .............. 277/637; 277/644; 277/645; 277/648; 277/921

(58) Field of Search .................. 277/637, 640, 277/644, 645, 648, 651, 921

(56) References Cited

U.S. PATENT DOCUMENTS

| | | | |
|---|---|---|---|
| 3,165,793 | * | 1/1965 | Lynch .................. 277/645 X |
| 4,165,083 | * | 8/1979 | Dochnahl .................. 277/637 X |
| 4,310,164 | * | 1/1982 | Mesnel .................. 277/645 X |
| 4,399,644 | * | 8/1983 | Bright .................. 277/637 X |
| 4,424,976 | * | 1/1984 | Hayashi .................. 277/645 X |
| 4,447,065 | * | 5/1984 | Dupuy et al. ........... 277/645 X |
| 4,448,430 | * | 5/1984 | Bright .................. 277/645 X |
| 4,483,113 | * | 11/1984 | Kruschwitz .................. 52/208 |
| 4,614,347 | * | 9/1986 | Kruschwitz .................. 277/645 X |
| 4,649,668 | * | 3/1987 | Skillen et al. .................. 49/374 |
| 4,690,412 | * | 9/1987 | Tuckley et al. .................. 277/921 X |
| 4,708,351 | * | 11/1987 | Midooka et al. .................. 277/645 X |
| 4,744,570 | * | 5/1988 | Kranz .................. 277/921 X |
| 4,749,203 | * | 6/1988 | Bright .................. 277/645 X |
| 4,864,774 | * | 9/1989 | Onishi et al. .................. 49/440 |
| 4,888,929 | * | 12/1989 | Vaughan et al. .................. 52/204.597 |
| 4,976,067 | * | 12/1990 | Maass .................. 277/648 X |
| 4,982,529 | * | 1/1991 | Mesnel .................. 277/645 X |
| 5,007,202 | * | 4/1991 | Guillon .................. 277/644 X |
| 5,033,246 | * | 7/1991 | Vaughan et al. .................. 52/204.597 |
| 5,257,791 | * | 11/1993 | Cittadini et al. .................. 277/645 X |
| 5,489,104 | * | 2/1996 | Wolff .................. 277/648 X |
| 5,575,485 | * | 11/1996 | Merla et al. .................. 277/645 X |
| 5,622,008 | * | 4/1997 | King .................. 49/498.1 |
| 5,634,644 | * | 6/1997 | Guillon .................. 277/645 X |
| 5,826,378 | * | 10/1998 | Gallas .................. 277/644 X |
| 6,070,363 | * | 6/2000 | Vance .................. 277/921 X |
| 6,073,936 | * | 6/2000 | Kirchmann et al. .................. 277/640 |
| 6,098,992 | * | 8/2000 | Long et al. .................. 277/637 |

FOREIGN PATENT DOCUMENTS

| | | | | |
|---|---|---|---|---|
| 27669 | * | 7/1990 | (AU) .................. | 277/645 |
| 43 20 330 A1 | | 10/1994 | (DE) .................. | B60J/10/04 |

* cited by examiner

Primary Examiner—Terry Lee Melius
Assistant Examiner—Robert G. Santos
(74) Attorney, Agent, or Firm—Synnestvedt & Lechner LLP (57) ABSTRACT

A sealing system is disclosed having at least one sealing profiled section for the roof frame of the vehicle. The sealing profiled section is formed by a profile strip of at least one elastomer and by a reinforcement. The reinforcement is formed as prefabricated injection-molded plastics material part and, in a molding tool, is provided with the profile strip on at least a part of its external surface. The reinforcement has a substantially U-shaped cross-section over its entire length. The sealing system is three-dimensional and can be fixed to connecting pieces of the roof frame of the vehicle by fastening members. An end cap is formed on at least one end face of each sealing profiled section in the molding tool.

20 Claims, 9 Drawing Sheets

SEALING SYSTEM FOR THE ROOF FRAME OF A HARD-TOP, COUPE, OR CONVERTIBLE

FIELD OF THE INVENTION

The invention relates to a sealing system having at least one sealing profiled section for the roof frame of a hard-top, coupe, or a folding soft top for a convertible.

BACKGROUND OF THE INVENTION

In one known sealing system of this type (shown in German utility model DE 295 09 880 U1, FIG.7) elastomer sealing lips are injected only onto free longitudinal edges of the legs of the reinforcement which is injection molded from plastics material. The sealing lips are in sealing contact on the one hand permanently with the material of a folding soft top and on the other hand, upon closure of a window, with the lateral surfaces of the window glass. A terminating closure of this sealing profile at the end face is not apparent.

From published German patent application DE 43 20 330 A1, FIG.2, there is known per se a sealing system which is closable by a snap connection and whose reinforcement can consist of metal or plastics material. The sealing system extends linearly in the installed state (FIG. 1) and is manufactured by coextrusion and then cut to length. The cutting to length contaminates the end-face ends which must then be expensively cleaned before they are made ready to be fitted.

In German Patent DE 36 44 283 C1 the ball socket and the complementary ball-shaped end piece are not formed on the open end-faces of the opposing sealing sections. On the contrary, these parts are connected to the sealing sections by adhesive or by vulcanization. These methods of connection require an additional, economically disadvantageous working step.

From German Patent DE 43 44 373 C1 it is known per se, for a convertible soft top, to provide hollow profiled seals which follow each other in succession, each with so-called sealing heads on the opposing end faces. In the closed state of the folding roof or soft top respective adjacent sealing heads contact one another sealingly with compressive force. According to column 4, lines 29 to 31, the sealing heads are each formed on the end-face ends of the hollow profiled seals. In the description it is not apparent however how this forming should take place. Clearly, for the hollow profiled seals, one is talking here about extruded profiles which after the forming of the sealing heads are deformed and fitted only two dimensionally. This deformation takes place in a further, additional working step such that the hollow profiled seals are "latched" into a metallic sealing rail, as is evident from the details of FIG.5. The metallic sealing rail is mounted beforehand on the roof shell or on a roof frame part with fastening members in a separate fitting process.

From published European application EP 0 521 611 A1 it is known per se initially to mount a metallic retaining profile on the roof frame of the motor vehicle in a manner which is not shown in detail. Subsequently, an extruded sealing profile is "latched" into the retaining rail. In the case of a convertible as shown in FIG.3, the individual sections of the sealing system are each provided with a foam rubber cap on the end faces which face one another. Adjacent foam rubber caps are pressed sealingly against one another when the soft top is closed (FIG.3). In the application it is not evidence how the foam rubber caps are mounted on the sealing profile.

From published French application FR 2 613 414 A1 it is known per se to manufacture a comparatively hard insert profile separately and to latch this to the sealing profile in a separate working step. The combination profile which is thus made is subsequently connected to the bodywork by means of fastening members.

In published German patent publication DE 40 38 694 A1, specially shaped end pieces are vulcanized on to tubular sections. However, the end pieces do not sealingly close off the end faces of the tubular sections in the sense of an end cap. On the contrary, the internal chamber of each tubular section issues at the end face of the associated end piece.

SUMMARY AND OBJECTS OF THE INVENTION

It is the object of the invention to improve the accuracy of dimensions and shape of three-dimensional shaped sealing profiled sections inclusive of their at least one end cap, and to simplify their manufacture.

This object is achieved by forming each sealing profiled section of at least one elastomer which is reinforced by a reinforcement. The reinforcement is formed as prefabricated injection molded plastics material part in a molding tool. The reinforcement is provided at least on a part of its external surface with the profile strip. The reinforcement has an essentially U-shaped cross section over at least approximately its entire length. The sealing system is three dimensional and is arranged to be secured to connecting pieces of the roof frame by fastening members. An end cap is formed on at least one end face of each sealing profiled section in the molding tool. The sealing system can be made as one piece or in several parts. Thus, for example, for a hardtop or a coupe there would be only one sealing profiled section extending from the A-pillar up to and including the C-pillar, whereas in the case of a folding soft top of a convertible it would have several sealing profiled sections. The prefabricated reinforcement permits manufacture in the most complex three-dimensional forms very accurately in terms of dimensions and shape. Subsequently, in the molding tool, the profile strip of at least one elastomer and also the at least one end cap can be formed with the same accuracy. The finished sealing profiled section can be fitted to the associated motor vehicle basically without any subsequent deformation. Any such deformation would produce undesirable stresses in the sealing profiled section and the danger that the profile strip would no longer provide a perfect seal. Nevertheless, the finished sealing profiled section is flexible within limits, in order to be able to take up tolerances in the vehicle structure during the fitting operation. The simultaneous formation of the at least one end cap on the sealing profiled section avoids a separate working step and enhances the dimensional and matching accuracy of the finished sealing profiled section.

For a particularly speedy and reliable fitting of the sealing profiled section, at least two of the fastening members are fixed to the reinforcement, spaced from one another. In the fitting of each sealing profiled section, each retaining member is pushed through a fitting hole of the associated connecting piece and is axially fixed relative to the connecting piece. Preferably, each retaining member is formed as a screw bolt which is axially securable by a nut.

One can achieve a particularly simple and advantageous sealing of the sideglass in the upper region of the roof frame with the exception of the C-pillar section by using a tubular profile which is closed in the circumferential direction and which extends out over free longitudinal edges of the reinforcement.

Additional sealing of the connecting piece is afforded by a sealing lip which extends laterally and cooperates sealingly with the connecting piece.

The sealing profiled section can be adjusted quickly and reliably during the fitting process because each fitting hole is preferably an elongate hole having a longitudinal axis extending transversely to a longitudinal axis of the associated sealing profiled section.

A trouble-free sealing even in the case of the critical C-pillar section is obtained by having the profile strip formed of sealing lips which extend out over free longitudinal edges of the reinforcement. Here, the reinforcement can have holes for fastening elements made before the addition of the profile strip, and by means of which the C-pillar section is subsequently fitted to the roof frame. Holes in the profile strip are in alignment with these holes in the reinforcement. These holes are preferably made in the molding tool during the formation of the profile strip on the reinforcement. By these means the fitting of the sealing profiled section is facilitated. By the enlargement of the leg height of the reinforcement and consequently of the finished sealing profiled section towards its lower end, the sideglass can be reliably sealed and guided even in the critical region of the C-pillar.

By fixing the free longitudinal edges of the sealing lips tightly against one another in the upper end region of the C-pillar section, a type of tubular profile can be introduced which is preferably located against the adjacent upper section of the roof frame. In this upper end region of the C-pillar section the sealing lips can be secured to one another, for example by vulcanization.

Elastomer material may be reduced and a good fitting basis for the fastening members may be created by ensuring that the reinforcement is free from an inner surface of the profile strip.

The reinforcement can be made comparatively thin-walled by using a supporting profile of the associated connecting pieces of the roof frame to support the side faces of the fitted sealing system, thus saving on costs. Nevertheless, the supporting profile is sufficient in all operating circumstances even with comparatively large leg heights of the sealing profiled section for a shape accurate fitting of the sealing profiled section.

Additional bending and torsion stiffness for the reinforcement, and consequently for the whole sealing system, may be created by providing the reinforcement with at least one stiffening rib in an internal chamber of its substantially U-shaped cross section. For the same stiffness the basic profile of the reinforcement can be made with thinner walls and thus reduce material.

The reinforcement may be stiffened as needed by incorporating the following features. Forming the one stiffening rib as a longitudinal rib extending in a longitudinal direction of the reinforcement; forming the stiffening ribs as transverse ribs arranged spaced from one another in a lengthwise direction of the reinforcement and extending in a transverse direction relative to the reinforcement; extending each transverse rib from a leg of the reinforcement to a base of the reinforcement; and connecting each transverse rib to a base of the reinforcement and extending the transverse ribs from a leg of the reinforcement as far as another leg of the reinforcement. Preferably, the longitudinal ribs are formed on the base of the reinforcement and the transverse ribs are located at a spacing of for example 5 to 30 mm from one another.

These and further features and advantages of the invention will now be described in more detail with reference to a number of embodiments which are given by way of example and which are shown in the drawings.

DETAILED DESCRIPTION OF PREFERRED EMBODIMENTS

Figure 1:
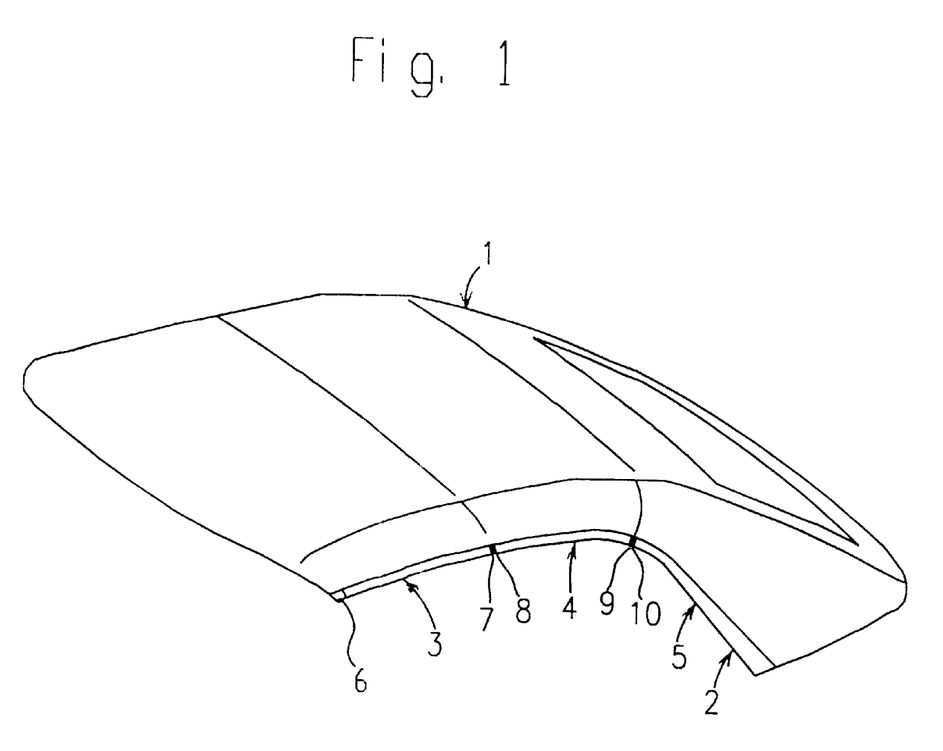
FIG. 1 is a perspective view, at an angle from above, of a folding soft top of a convertible.

FIG. 1 shows a folding soft top 1 of a convertible, whose roof frame is provided on each side with a three-part sealing system 2. Each sealing system 2 comprises a front, upper sealing profiled section 3, a rear, upper sealing profiled section 4 and a C-pillar section 5. The sections 3 to 5 are each secured to connecting points of the associated soft top struts. The section 3 has end caps 6 and 7 formed thereon, the section 4 has end caps 8 and 9 formed thereon and the section 5 has an end cap 10 formed thereon on its upper end.

In all the Figures of the drawings, the same or equivalent parts are denoted by the respective same reference numerals.

Figure 2:
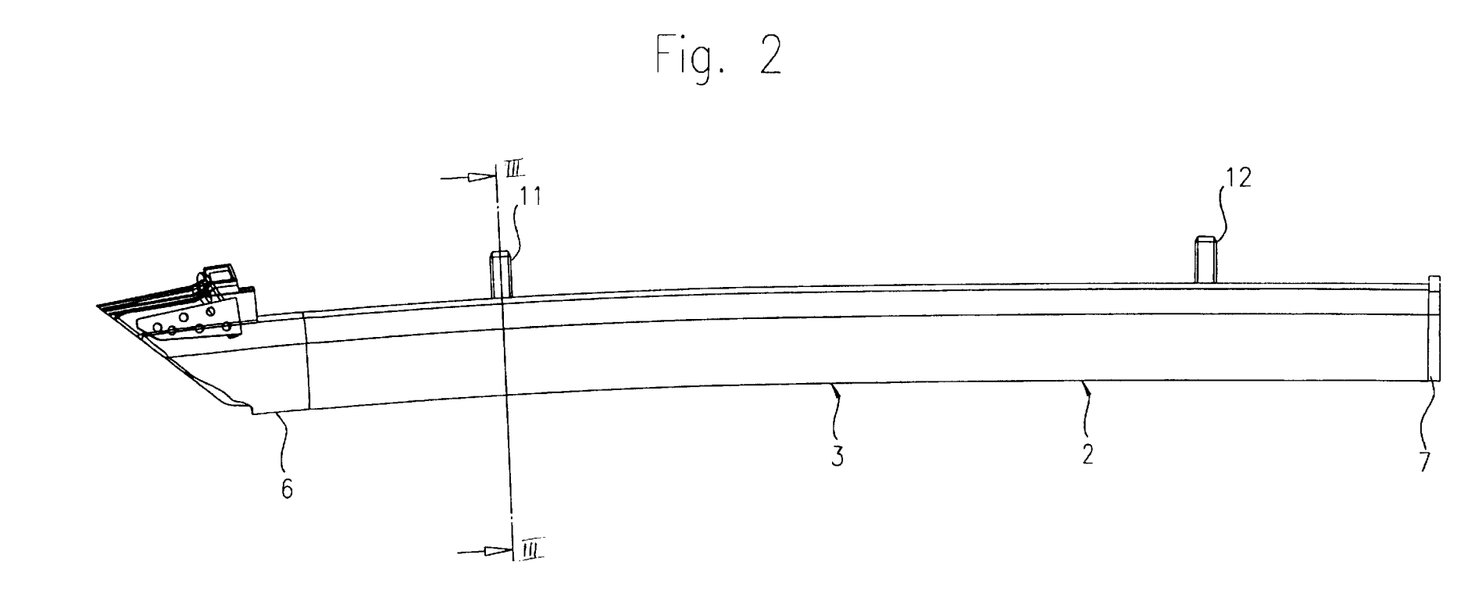
FIG. 2 is a side view of an upper, front sealing profiled section of the sealing system.

According to FIG. 2, the section 3 comprises two retaining members 11 and 12 which are formed as screw bolts and which are arranged spaced from one another. The lower end of each retaining member is anchored in a reinforcement 13 (FIG. 3) of the section 3.

Figure 3:
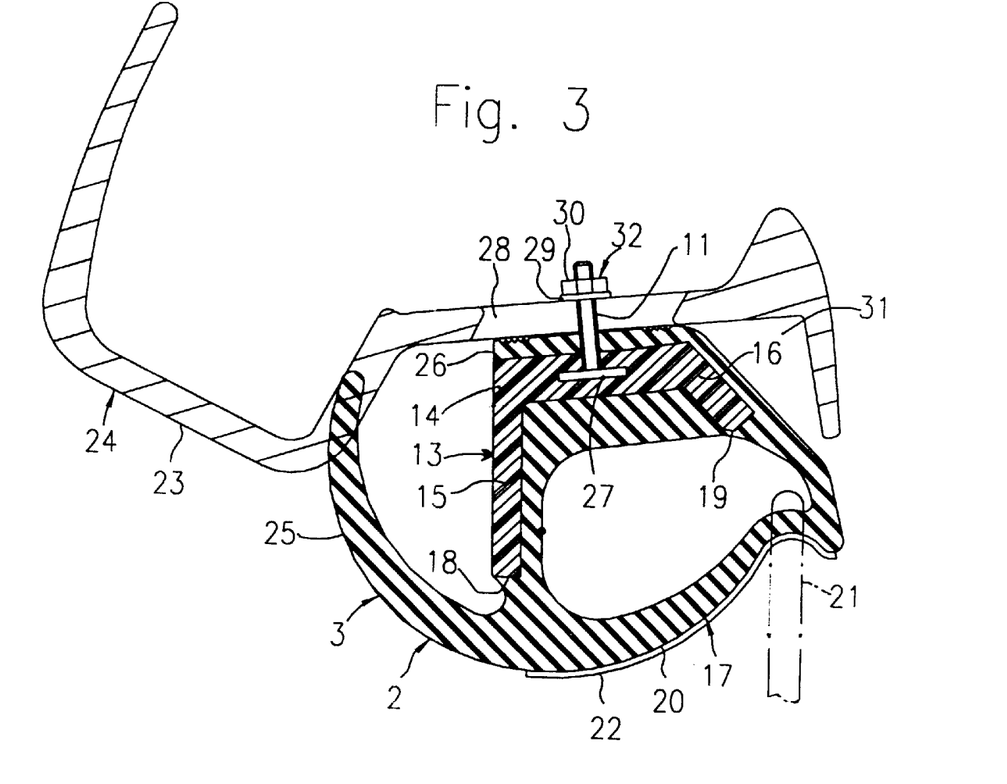
FIG. 3 is the sectional view along the line III—III in FIG. 2, on an enlarged scale.

In FIG. 3 one can see details of the front, upper sealing profiled section 3. Additionally, the installation situation is shown.

For the reinforcement 13 there is used an injection-molded plastics part of essentially U-shaped cross-section having a base 14 and legs 15 and 16 integrally formed at the sides of the base. The reinforcement 13 is three-dimensionally preformed by injection molding and then is introduced into a molding tool. In the molding tool a profile strip 17 of at least one elastomer is formed on the reinforcement 13.

The profile strip 17 comprises a tubular profile 20 which is closed in the circumferential direction and which extends out over free longitudinal edges 18 and 19 of the legs 15, 16 of the reinforcement 13. The tubular profile 20 can be provided with a known per se layer 22 of low-friction paint or flocking on its outer surface which comes into contact with a sideglass 21. On the tubular profile 20 there is formed a sealing lip 25 which extends laterally and which cooperates sealingly with a connecting part 23 of the roof frame 24 which in this case is formed as soft top struts. The sealing lip 25 is shown in FIG. 3 in its relaxed, inactive position.

The profile strip 17 also includes a base layer 26 which overlies the base 14 on its side which faces the connecting part 23.

The retaining member 11 is anchored by having a foot 27 in the base 14 of the reinforcement 13 so that it is rotationally fixed. A screw bolt of the retaining member 11 extends through the base layer 26 and a mounting hole 28 in the connecting part 23. The mounting hole 28 is formed as an elongate hole, whose longitudinal axis extends transversely to a longitudinal axis of the sealing system 2. Thus, the section 3 can be adjusted transversely to its longitudinal axis during the assembly and then can be fixed in the desired operational position by means of a washer 29 and a nut 30. By this means, the base layer 26 is pressed sealingly against the connecting part 23. The section 3 extends in a receiving channel 31 of the connecting part 23. Each retaining member 11, 12 and the associated washer 29 and nut 30 form a fastening member 32 for the sealing profile 2.

Figure 4:
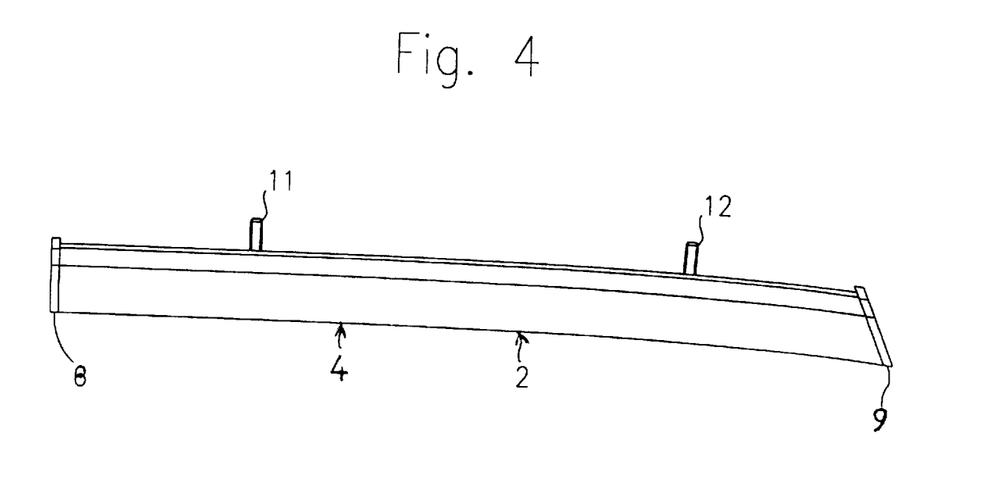
FIG. 4 is a side view of an upper, rear sealing profiled section of the sealing system.

In FIG. 4 are shown details of the rear, upper sealing profiled section 4. Again, the section 4 is provided with two retaining members 11, 12 in the same manner as the section 3 shown in FIGS. 2 and 3. The cross-sectional shape of the section 4 is the same as the cross-sectional shape of the section 3 shown in FIG. 3.

Figure 5:
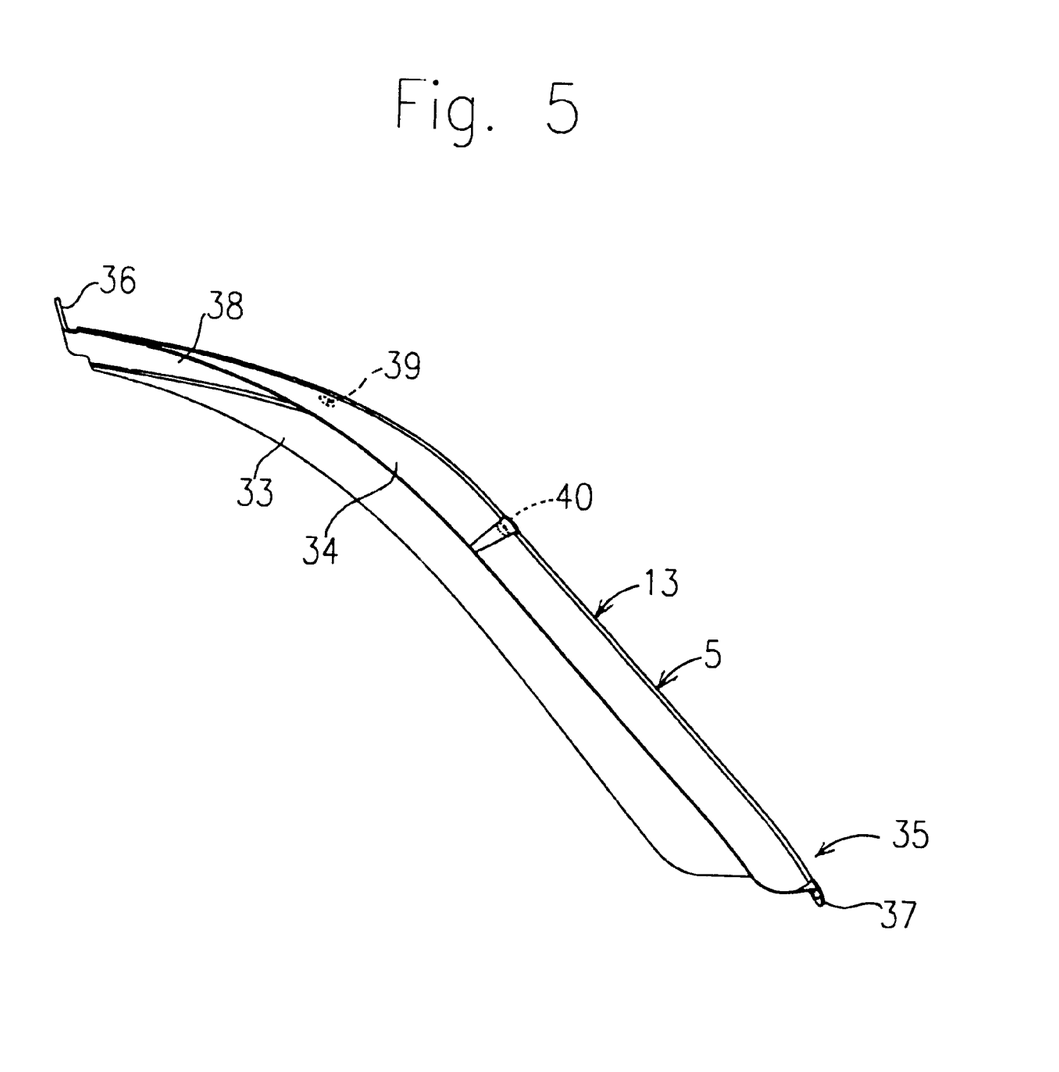
FIG. 5 is a side view of a reinforcement for the C-pillar section of the sealing system.

FIG. 5 shows a comparatively thin-walled design of the reinforcement 13 for the C-pillar section 5. It is to be noted that the height of legs 33 and 34 of the reinforcement 13 increases over the length of the reinforcement 13 down to the lower end region 35 of the C-pillar section 5. The reinforcement 13 carries at the top an upwardly angled mounting tongue 36, and at the bottom a mounting tongue 37. Furthermore, holes 39 and 40 for fastening members 41 (FIG. 7) are formed in a base 38 of the reinforcement 13.

The reinforcement 13 shown in FIG. 5 is made from plastics material by an injection molding process, and then is introduced into a molding tool and is injection-coated with at least one elastomer. During this process the end cap 10 is injected on as well. The plate-like shape of this end cap is particularly clearly visible from FIG. 6.

Figure 6:
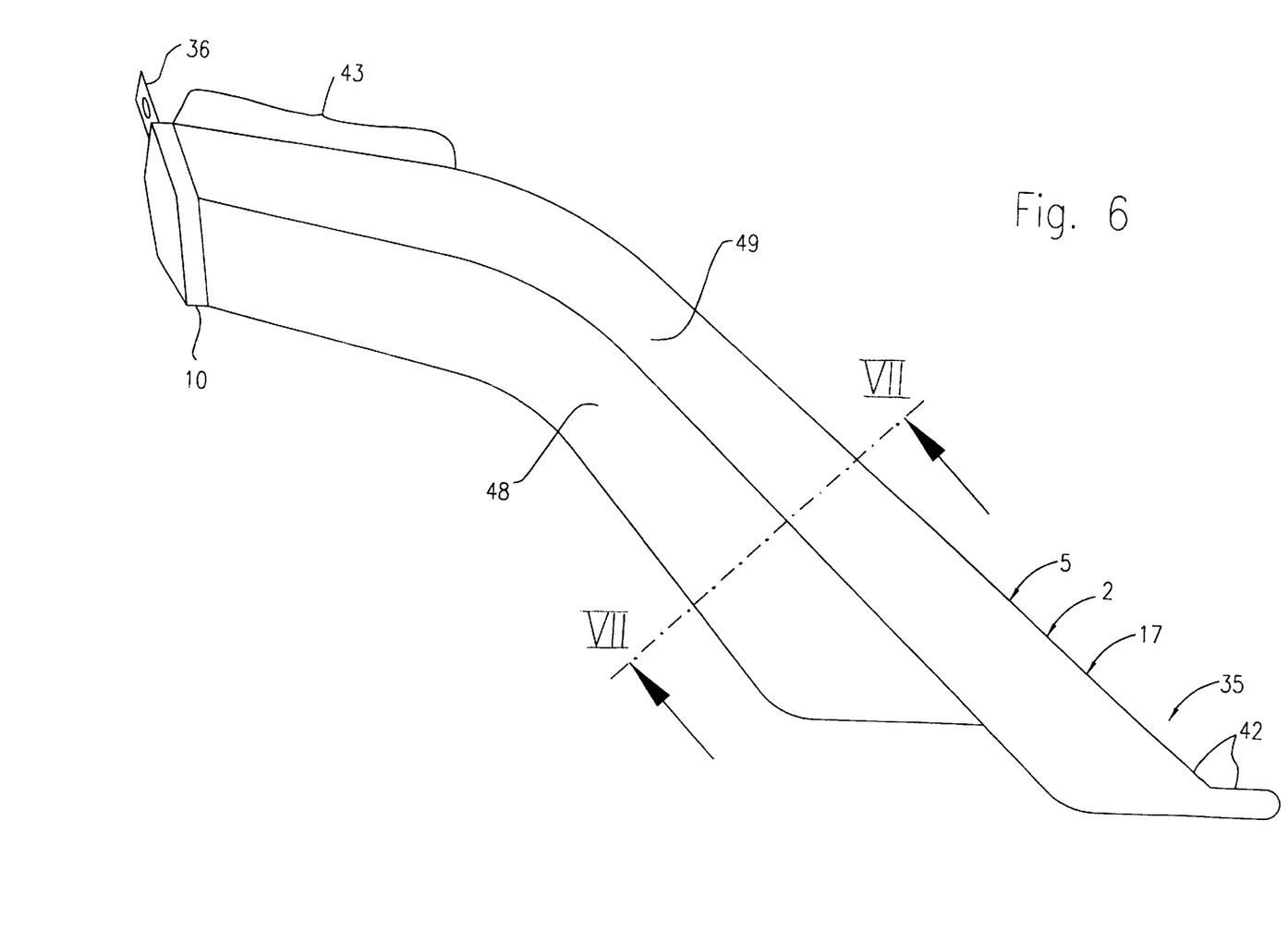
FIG. 6 is a side view of the finished C-pillar section of the sealing system with reinforcement according to FIG. 5 in place.

FIG. 6 shows the finished C-pillar section 5 of the sealing system 2 with the profile strip 17 of at least one elastomer formed on the reinforcement 13 (FIG. 5), and, as mentioned, with the end cap 10 formed thereon. An end piece 42 of the profile strip 17 is integrally formed at the lower end region 35 of the C-pillar section 5. The end piece 42 serves as the tight closure against an adjacent sealing profile which is not shown. In an upper end region 43 of the section 5, free longitudinal edges 44 and 45 (FIG. 7) of sealing lips 46 and 47 of the profile strip 17 are secured tightly against one another. This creates a tube-like profile strip portion in the upper end region 43.

As shown in FIG. 6, the profile strip 17 comprises legs 48, 49 of the profile strip 17 formed on the legs 33, 34 (FIG. 5).

Figure 7:
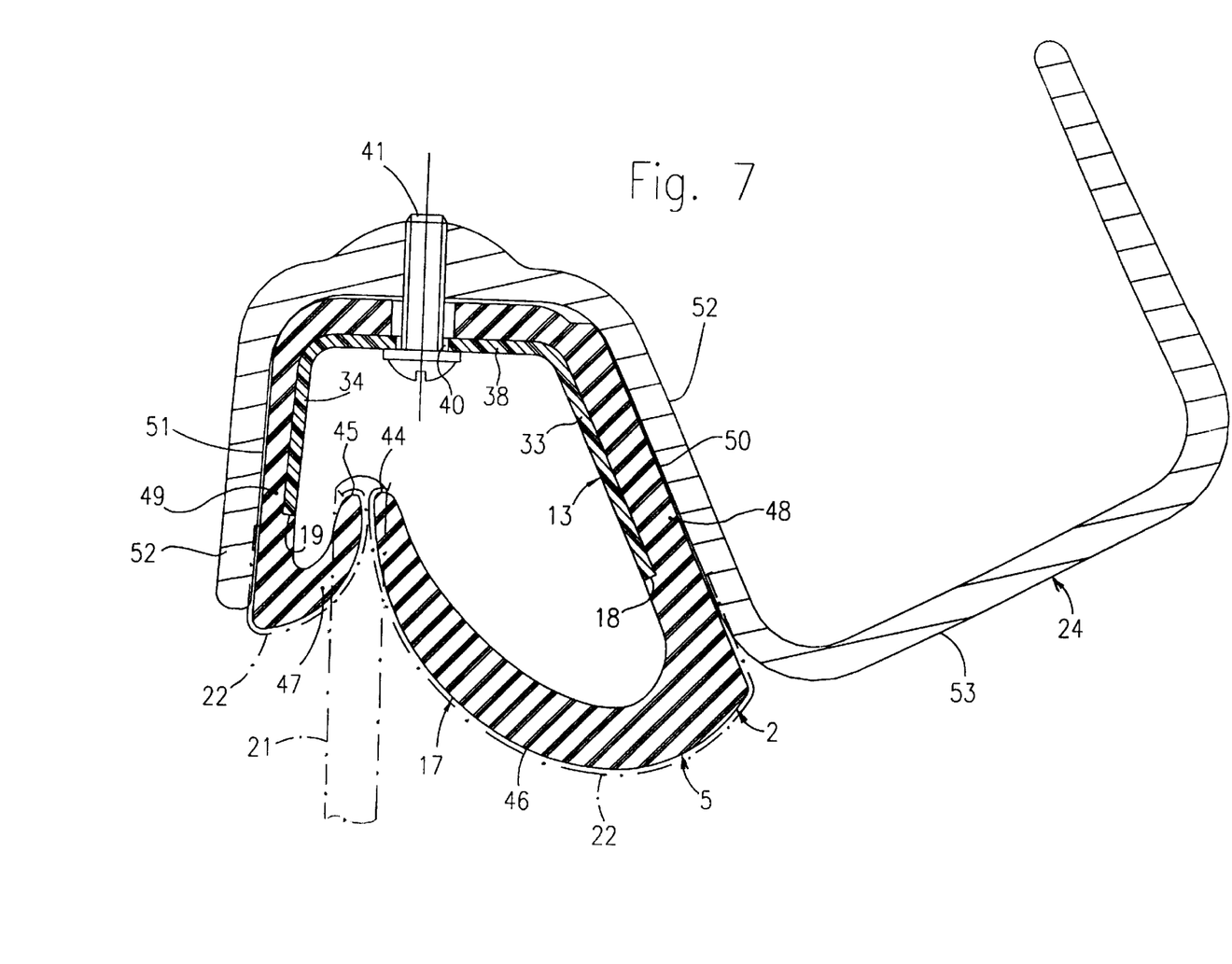
FIG. 7 is the sectional view taken along the line VII—VII in FIG. 6, on an enlarged scale.

In FIG. 7 it can be seen that the lips 46, 47 are coated on their sides facing the sideglass 21 with the special low-friction layer 22. Side faces 50 and 51 of the legs 48, 49 are supported by a supporting profile 52 of the associated connecting part 53 of the roof frame 24. Thus, in spite of the comparatively thin-walled structure of the reinforcement 13, this does not lead to undesirable changes of shape of the C-pillar section 5 in the assembled state of the C-pillar section 5.

Figure 8:
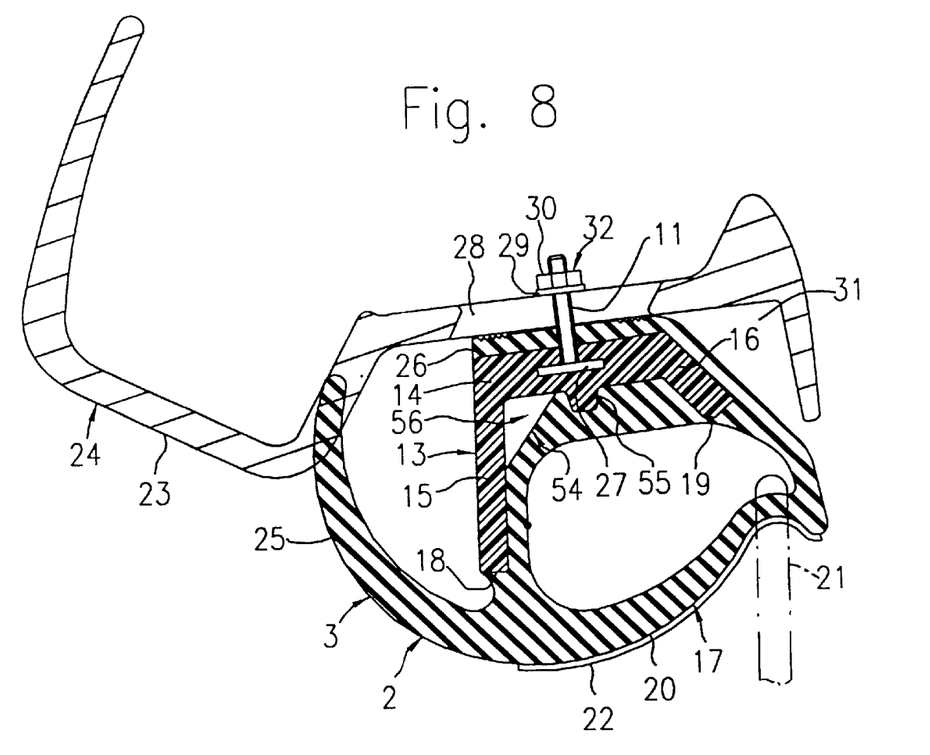
FIG. 8 is a cross-sectional view, corresponding to FIG. 3, through another embodiment.

In contrast to the embodiment shown in FIG. 3, that shown in FIG. 8 differs in that the reinforcement 13 is equipped with stiffening ribs 54 and 55 in order to increase its stiffness and shape stability. The stiffening ribs 54, 55 are each arranged in an internal chamber 56 of the substantially U-shaped cross-section of the reinforcement 13.

By stiffening ribs 54 one is talking about transverse ribs which extend in a direction transversely to the reinforcement 13 and are arranged along the length of the reinforcement 13 at a distance from one another and parallel to one another. This spacing of the transverse ribs 54 from one another is chosen to be the optimum for the particular needs of individual circumstances. The thickness of the transverse ribs is approximately the same as the thickness of the leg 15. With the provision of such transverse ribs 54, the thickness of the leg 15 can be smaller than without such transverse ribs. Each transverse rib 54 extends from the leg 15 to the base 14 of the reinforcement 13.

In contrast, the stiffening rib 55 is formed as a longitudinal rib extending in the longitudinal direction of the reinforcement 13. The longitudinal rib 55 is formed on the base 14 of the reinforcement 13. All stiffening ribs 54, 55 increase the resistance of the reinforcement 13 to bending and torsion and consequently the resistance of the sealing profiled section 3 to bending and torsion.

Figure 9:
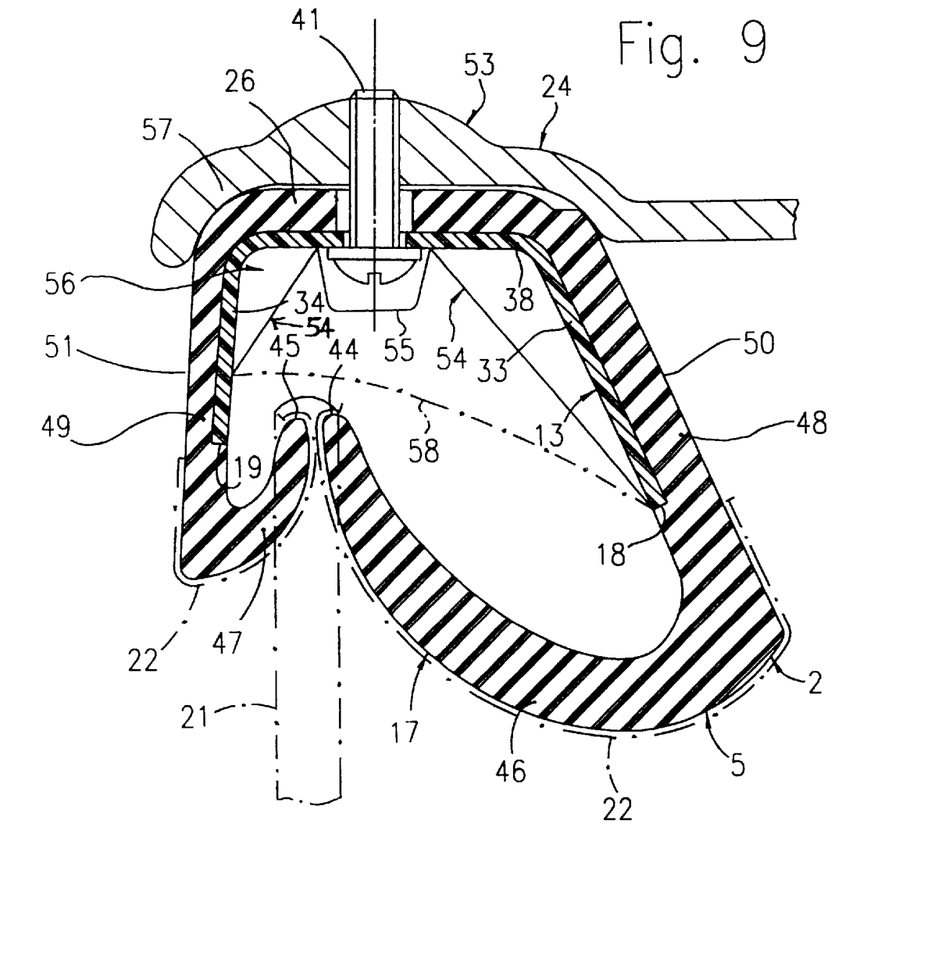
FIG. 9 is a cross-sectional view, corresponding to FIG. 7, through a further embodiment.

The embodiment according to FIG. 9 modifies that shown in FIG. 7. Instead of the supporting profile 52 in FIG. 7 there is in FIG. 9 a retaining profile 57 of the associated connecting part 53 of the roof frame 24. The retaining profile 57 provides support for the base layer 26 and the base 38. The legs 33, 34; 48, 49 of the C-pillar section 5 are strengthened by the stiffening ribs 54, 55 such that a lateral external guidance of the legs by the side walls of the supporting profile 52 shown in FIG. 7 is here unnecessary.

In FIG. 9, the longitudinal rib 55 is interrupted only at those points at which the fastening members 41 are located. Transverse ribs 54 extend from the base 38 to the legs 33, 34 on both sides of the longitudinal rib 55. In FIG. 9, the lower boundary edge of a stiffening rib 58 formed as a transverse rib is indicated by chain-dotted lines. The transverse rib 58 is connected to the base 38 and extends from the free longitudinal edge 18 of the leg 33 as far as the other leg 34 of the reinforcement 13. In this way the stiffening rib 58 forms a particularly stiff membrane within the internal chamber 56 of the reinforcement 13. In this case, several such transverse ribs 58 are arranged at a suitable spacing from one another in the longitudinal direction of the reinforcement 13.

As elastomers for the profile strip 17, the following materials can for example be used:

Foam rubber of a hardness of 10 to 30 Shore-A or soft rubber of a hardness of 30 to 70 Shore-A, both made for example from EPDM, SBR, CR, ECO, blends (mixtures) of EPDM with SBR with an EPDM content by weight of 20 to 90%, blends of EPDM with SBR and/or polyocteneamer, or NBR.

The following thermoplastic elastomers (TPE) can for example also be used:

TPE based on styrene ethylene butylene styrene (SEBS),

TPE based on styrene butylene styrene (SBS),

TPE based on styrene isoprene styrene (SIS),

TPE based on elastomer compositions formed as TPO blends or TPO alloys, for example of linked EPDM/propylene blend (EPDM/PP) or Ethylene vinyl acetate/vinylidene chloride (EVA/PVDC) or TPE based on thermoplastic polyurethanes (TPU); TPO is the abbreviation for thermoplastic polyolefins (elastomers).

The profile strip 17 can be formed from several of the aforementioned elastomers, which are then vulcanized to one another along the boundary surfaces which come into contact with each other. Then, a chemical bond of sufficient strength is created between the individual parts of the profile strip 17.

The reinforcement 13 consists in contrast of a thermoplastics plastics material. For this the following materials can for example be used:
PPE polyphenylene ether,
PP polypropylene,
PE(LDPE, low density PE),
PE (HDPE, high density PE),
PIB polyisobutylene,
PS polystyrene,
PA polyamide,
PC polycarbonate,
PETP polyethylene terephthalate,
POM polyoxymethylene,
   Epoxy resins,
   Phenol-formaldehyde resins,
PES polyester,
PPO polyphenylether,
PVP polyvinylchloride or modifications of these thermoplastic plastics materials.

These plastics materials can be used with or without reinforcement, for example reinforcement by carbon fibres or glass fibres or by minerals (talc).

Between the profile strip 17 and the reinforcement 13 a layer of a coupling material can be provided (not shown). The coupling material has the object of improving the chemical bond between the elastomer of the profile strip 17 and the thermoplastic plastics material of the reinforcement 13. The following materials can be used for example as coupling material:

EPDM blended with PP, PE, PS, PIB, PES, as well as other polymers from the aforementioned list of materials for the reinforcement 13 in an amount by weight less than 20%, Blended EPDM—CR—SBR—polyocteneamer or EPDM compounds with resin additions (e.g. epoxy resins) or other conventional commercial adhesive agents.

If the profile strip 17 consists of a TPE, then for example a polypropylene primer can be used as coupling material.

What is claimed is:

1. A sealing system for the roof frame of a hardtop, coupe, or folding soft top for a convertible, said roof frame having connecting pieces, said sealing system comprising:

at least one sealing profiled section comprising a profile strip of at least one elastomer, said sealing profiled section having end faces arranged at the ends thereof;

a reinforcement for reinforcing said profile strip, said reinforcement comprising a prefabricated injection molded plastics material part having an external surface, said reinforcement being injection-coated in a molding tool with said profile strip on at least a part of said external surface of said reinforcement, and said reinforcement having an essentially U-shaped cross section at least substantially over its entire length;

said sealing system being three dimensional and adapted to be secured to said connecting pieces by retaining members; and an end cap injection molded in said molding tool onto at least one of said end faces of said sealing profiled section.

2. A sealing system according to claim 1, wherein said reinforcement comprises a plurality of legs extending from a base, said legs having free longitudinal edges, and said profile strip further comprises a tubular profile which is closed in the circumferential direction and which extends outwardly over said free longitudinal edges of said legs of said reinforcement.

3. A sealing system according to claim 2, wherein said tubular profile comprises a sealing lip formed thereon, said sealing lip extending laterally of said tubular profile to cooperate sealingly with one of said connecting pieces.

4. A sealing system according to claim 1 comprising a sealing profiled section mountable on a C-pillar of a motor vehicle to seal a frameless sideglass of said motor vehicle, wherein:

said reinforcement comprises a plurality of legs extending from a base, each of said legs having a free longitudinal edge; and said profile strip comprises sealing lips extending outwardly over said free longitudinal edges of said legs, said sealing lips having free longitudinal edges facing one another for cooperating sealingly with said frameless sideglass, the height of said legs increasing over the length of said reinforcement down to a lower end region of said C-pillar sealing profiled section.

5. A sealing system according to claim 4, wherein said free longitudinal edges of said sealing lips are secured tightly against one another in an upper end region of said C-pillar sealing profiled section.

6. A sealing system according to claim 4, wherein said reinforcement further comprises an inner surface which is free from said profile strip.

7. A sealing system according to claim 1, wherein said U-shaped cross section of said reinforcement has an internal chamber, said reinforcement further comprising at least one stiffening rib disposed within said internal chamber.

8. A sealing system according to claim 7, wherein said stiffening rib comprises a longitudinal rib extending in a longitudinal direction of said reinforcement.

9. A sealing system according to claim 7, comprising a plurality of said stiffening ribs formed as transverse ribs arranged spaced from one another in a lengthwise direction of said reinforcement, said transverse ribs extending in a transverse direction relative to said reinforcement.

10. A sealing system according to claim 9, wherein said reinforcement comprises a plurality of legs extending from a base, and wherein each said transverse rib extends from one of said legs of said reinforcement to said base of said reinforcement.

11. A sealing system according to claim 9, wherein said reinforcement comprises a plurality of legs extending from a base, and wherein each said transverse rib is connected to said base of said reinforcement and extends from one of said legs as far as to another of said legs of said reinforcement.

12. A sealing system according to claim 8, comprising a plurality of said stiffening ribs formed as transverse ribs arranged spaced from one another in a lengthwise direction of said reinforcement, said transverse ribs extending in a transverse direction relative to said reinforcement.

13. A sealing system for the roof frame of a hardtop, coupe, or folding soft top for a convertible, said sealing system comprising:

connecting pieces for securing said sealing system to said roof frame;

at least one sealing profiled section comprising a profile strip of at least one elastomer, said sealing profiled section having end faces arranged at the ends thereof;

a reinforcement for reinforcing said profile strip, said reinforcement comprising a prefabricated injection molded plastics material part having an external surface, said reinforcement being injection-coated in a molding tool with said profile strip on at least a part of said external surface of said reinforcement, and said reinforcement having an essentially U-shaped cross section at least substantially over its entire length;

said sealing system being three dimensional and adapted to be secured to said connecting pieces by retaining members; and an end cap injection molded in said molding tool onto at least one of said end faces of said sealing profiled section.

14. A sealing system according to claim 13, further comprising a plurality of said retaining members fixed to said reinforcement and spaced from one another for connecting said sealing system to said connecting pieces, said connecting pieces having respective fitting holes for receiving said retaining members, said retaining members being pushable through said respective fitting holes when fitting said sealing profiled sections to said connecting pieces, said retaining members being axially fixable relatively to said connecting pieces.

15. A sealing system according to claim 14, wherein each said retaining member is formed as a screw bolt which is axially securable by a nut.

16. A sealing system according to claim 14, wherein each said fitting hole is an elongate hole having a longitudinal axis extending transversely to a longitudinal axis of said sealing profiled section.

17. A sealing system according to claim 14, wherein said reinforcement comprises a plurality of legs extending from a base, said legs having free longitudinal edges, and said profile strip further comprises a tubular profile which is closed in the circumferential direction and which extends outwardly over said free longitudinal edges of said legs of said reinforcement.

18. A sealing system according to claim 17, wherein said tubular profile comprises a sealing lip formed thereon, said sealing lip extending laterally of said tubular profile to cooperate sealingly with one of said connecting pieces.

19. A sealing system according to claim 13 comprising a sealing profiled section mountable on a C-pillar of a motor vehicle to seal a frameless sideglass of said motor vehicle, wherein:

said reinforcement comprises a plurality of legs extending from a base, each of said legs having a free longitudinal edge; and said profile strip comprises sealing lips extending outwardly over said free longitudinal edges of said legs, said sealing lips having free longitudinal edges facing one another for cooperating sealingly with said frameless sideglass, the height of said legs increasing over the length of said reinforcement down to a lower end region of said C-pillar sealing profiled section.

20. A sealing system according to claim 19, wherein at least one of said connecting pieces comprises a supporting profile and said sealing system comprises a pair of oppositely arranged side faces positioned between said supporting profile and said reinforcement, said side faces being supported by said supporting profile when said sealing system is fitted to said at least one connecting piece.

* * * * *

UNITED STATES PATENT AND TRADEMARK OFFICE
CERTIFICATE OF CORRECTION

PATENT NO. : 6,244,601 B1
DATED : June 12, 2001
INVENTOR(S) : Buchholz et al.

It is certified that error appears in the above-identified patent and that said Letters Patent is hereby corrected as shown below:

<u>Title page,</u>
Item [73], Assignee should read -- Meteor Gummiwerke K.H. Bädje GmbH & Co. --

Signed and Sealed this

First Day of October, 2002

*Attest:*

*Attesting Officer*

JAMES E. ROGAN
*Director of the United States Patent and Trademark Office*